Aug. 13, 1940.    W. L. McGRATH    2,211,573
HEATING SYSTEM
Filed Jan. 13, 1938
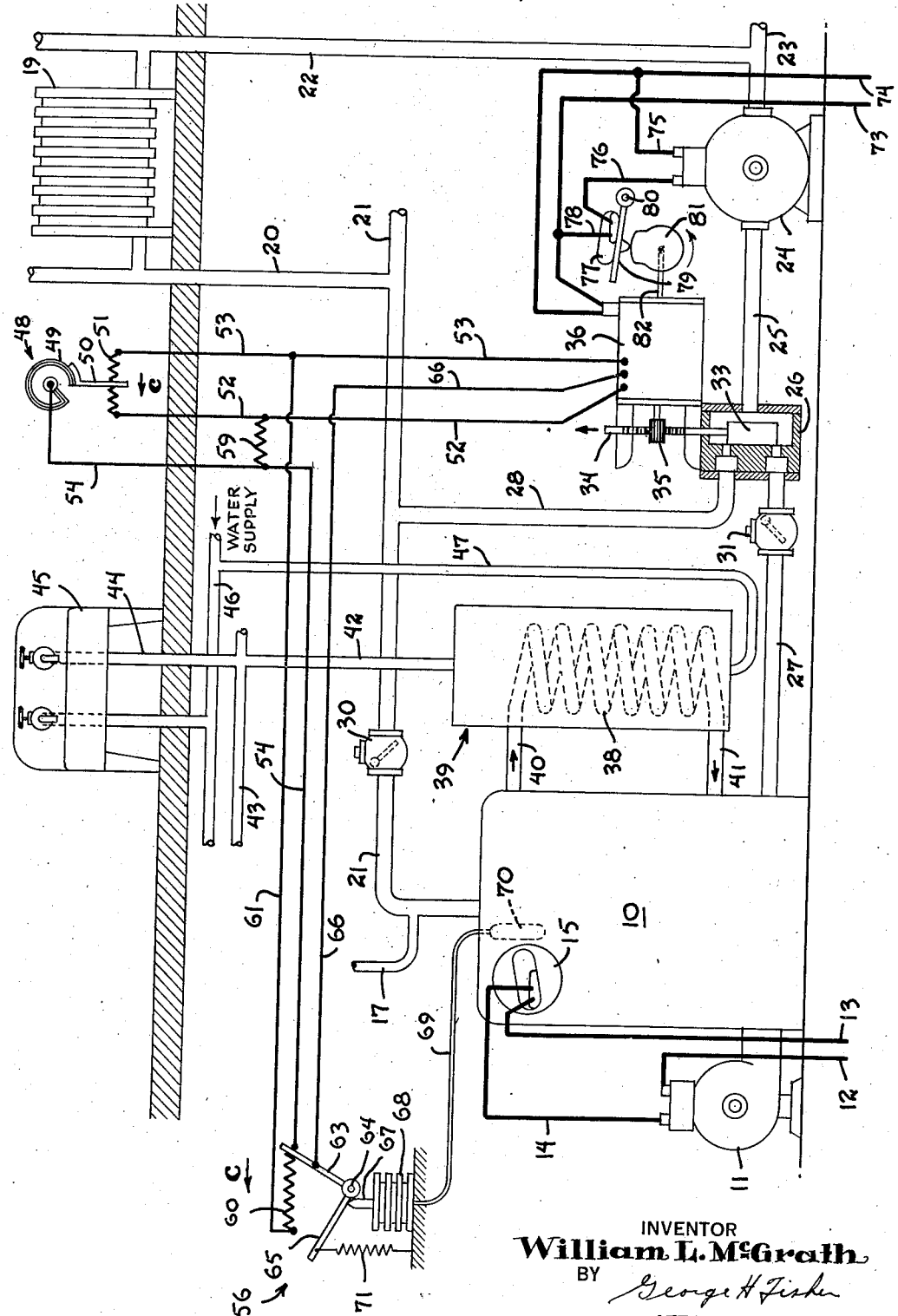
INVENTOR
William L. McGrath
BY
George H Fisher
ATTORNEY Patented Aug. 13, 1940

2,211,573

UNITED STATES PATENT OFFICE 2,211,573

HEATING SYSTEM

William L. McGrath, St. Paul, Minn., assignor to Minneapolis-Honeywell Regulator Company, Minneapolis, Minn., a corporation of Delaware Application January 13, 1938, Serial No. 184,813

10 Claims. (Cl. 237—8)

The present invention relates to heating systems, and is more particularly concerned with a heating system of the hot water type combining therein a domestic hot water heater and control apparatus for regulating the temperature of the building being heated and also the temperature of the boiler water.

In the past it has been customary in systems of this general nature to regulate the boiler temperature in response to a thermostat and to provide on and off means for controlling the supply of heating fluid to the space being heated, the on and off means being operated in response to a space thermostat. Arrangements have also been provided in the past whereby a three-way mixing valve has been utilized so as to by-pass a certain proportion of the circulating medium past the boiler thereby maintaining the spaces being heated at a predetermined temperature. By this arrangement the objectionable on and off operation of the circulating means is avoided. In systems of the nature such as that of the present invention employing a domestic hot water heater the boiler water temperature is maintained at a relatively high value of from 180° F. to 200° F. so that the supply of domestic hot water can always be maintained at a suitably high value. In systems employing a by-pass arrangement whereby the temperature of a building may be maintained at a predetermined value at all times, it has been found difficult to maintain the boiler water temperature at a high enough value so as to insure a continuous supply of domestic hot water at the proper temperature. This was due to the fact that under heavier heating loads a greater proportion of water is circulated through the boiler and a smaller portion was by-passed. This greater volume of water being circulated through the boiler tends to cause the boiler water temperature to fall to too low a value to properly maintain the supply of domestic hot water. This happens because heat for the boiler is ordinarily supplied by an electrically driven oil burner or the like which is controlled by a thermostat responsive to boiler water temperature and is operable to start the oil burner at a predetermined boiler water temperature. Under ordinary heating load conditions, this boiler thermostat will maintain the boiler water temperature substantially constant at this predetermined value but as pointed out above, when ususually large volumes of water are circulated through the boiler, the boiler water temperature will fall appreciably below the above mentioned predetermined value inasmuch as the oil burner or similar device supplies heat at a constant rate and cannot keep the boiler temperature up under the heavier load conditions occasionally encountered. The failure of the supply of domestic hot water may occur at crucial times bringing about great inconvenience and annoyance to occupants of the building being served by the heating system. For example, this particular annoyance may occur during the morning pick-up period when the heating load demands are unusually heavy after a night shutdown period. At this time hot water at a suitable temperature may be in great demand for purposes of hot baths or shaving and the failure of supply of proper temperatures is exceedingly irksome.

The above are examples of difficulties and inconveniences which it is an object and purpose of this invention to overcome. Among other particular objects of this invention is to provide a hot water heating system having means responsive to boiler water temperature to prevent said temperature from falling below a predetermined minimum value. In connection with this object, it is also embraced within the province of this invention to provide a domestic hot water heater of the indirect tankless type associated with the boiler. By reason of the prevailing relatively high boiling water temperature maintained at all times and the employment of this particular type heater wherein there is no substantial body or accumulation of water to be raised in temperature at one time, hot water is always available for domestic purposes practically instantaneously and in unlimited supply as the heater has no tank to become exhausted.

It is a further object of the invention to provide a hot water heating system having a by-pass valve for proportioning the quantities of water circulated through the boiler and by-passed around it and a positive acting modulating motor for positioning the valve in accordance with temperatures of the space being heated.

It is another object of the invention to provide a boiler temperature responsive control device to assume control of the by-pass proportioning valve when the boiler temperature reaches a predetermined minimum value for preventing its temperature from falling below that value.

Still another object of the invention is to provide an automatic device so correlated with the by-pass proportioning valve that water is positively circulated in the system whenever the valve is positioned so that water can be circulated through the boiler.

The single figure is a more or less diagrammatic showing of a heating system embodying the principles of the invention.

The heating system shown in the figure includes a boiler having a furnace associated therewith generally indicated at 10. Heat is supplied to the furnace for heating the boiler water by a heat generating device such as an oil burner or the like 11 which includes an electrically driven motor. Power is supplied to the electric motor 11 by conductors 12 and 13 from an external source of electrical energy, not shown. The conductor 13 connects to one electrode of a thermostatically operated mercury switching device 15, the other electrode of which connects through a conductor 14 to the electric motor associated with the oil burner device 11. Mercury switch 15 is of conventional type and is arranged to be automatically operated by a thermostat which is responsive to the temperature of the boiler water. The mercury switch 15 closes the circuit to the oil burner at a predetermined temperature of the boiler water and under average heating load conditions on the system will tend to maintain the boiler water temperature substantially constant.

The heating system includes radiators such as the radiator 19 which is connected by a pipe 20 to a header 21 which supplies hot water from the boiler to the various radiators. The radiator 19 has a return pipe 22 which connects to a return header carrying water from the various radiators of the building indicated by the numeral 23. The return header 23 connects to an electrically driven water circulating pump 24, the discharge side of which is connected by a pipe 25 to a proportioning by-pass valve generally indicated at 26. The proportioning by-pass valve 26 has one outlet connected to a discharge pipe 27 for returning water to the boiler and it also has an outlet connected by a pipe 28 to the supply header 21. The connection 28 forms a by-pass for by-passing return water to the supply side of the system. Located in the supply header between the boiler and the by-pass connection formed by the pipe 28 is a check valve 30 for preventing water from flowing backwards from the supply header into the boiler. Also in the pipe 27 leading from the by-pass valve to the boiler is a check valve 31 for preventing heated water from backing up out of the boiler into the by-pass proportioning valve 26. The proportioning by-pass valve 26 takes the form of a three-way valve shown as having one inlet and two outlets. The proportions of water permitted to flow through each of the outlets of the valve 26 is determined by the position of the valve member 33 which has a rack 34 which rack meshes with a pinion gear 35. The shaft upon which the pinion gear 35 is mounted is driven by a proportioning motor diagrammatically indicated at 36, the operation of which acts to position the valve member 33 of the valve 26 so as to govern the proportions of return water circulated by the circulator 24 through pipe 25 which are circulated through the boiler and by-passed through the by-pass connection 28 to the supply header 21. The proportioning motor 36 and the control thereof will be described more particularly hereinafter.

Associated with the boiler 10 is a tankless type indirect heater for heating water for domestic uses and purposes. The heater comprises a heat exchanger of the shell and coil type having a coil 38 located within a shell 39. Coil 38 is connected to the boiler by pipes 40 and 41 whereby conventional circulation of water takes place from the upper part of the boiler through pipe 40 through the coil and from the coil through pipe 41 back to the boiler. The shell of the heat exchanger is connected by pipe 42 to a domestic hot water supply header 43 which may be connected to various points of use of hot water such as by a connection 44 to a sink or the like generally indicated at 45. Water to be heated is supplied to the heat exhanger by the supply pipe 46 through a connecting pipe 47 to the lower part of the shell of the heat exchanger. The hot water heater of this invention does not employ a tank for the water to be heated which must be maintained at the desired temperature, but is of the tankless type employing a relation of heat exchange surfaces such that the boiler water temperature being maintained at a relatively high value a continuous supply of hot water for domestic use will be available from the heater 39.

The proportioning motor 36 for positioning the valve member 33 of by-pass valve 26 may be of the type which is shown and described in detail in United States Patent No. 2,028,110 of Taylor, granted January 14, 1936. Energy is supplied to the proportioning motor 36 by means of conductors 73 and 74 which lead to an external source of power (not shown). The proportioning motor 36 is controlled through the wires 52, 53 and 66 which are connected to relay coils within the casing of the proportioning motor 36 in a manner similar to that shown in the patent to Taylor. The electrical circuits for controlling the proportioning motor may be controlled by a room thermostat generally indicated at 48 similar to the thermostat shown in the patent to Taylor and by an additional thermostatic device indicated at 65 responsive to boiler water temperatures. The thermostat generally indicated at 48 comprises a bimetallic thermostatic element 49 of conventional type having movable arm 50 which forms a slider for slide-wire potentiometer resistance 51. Opposite ends of resistance 51 are connected by wires 52 and 53 as shown to opposite ends of a relay coil within the casing of the proportioning motor 36 similarly to the manner of connection shown in the Taylor patent. The boiler thermostat comprises an expansible bellows 68 filled with volatile fluid and connected by a tube 69 with a thermostatic bulb 70 which is located so as to be responsive to the boiler water temperatures. The bellows 68 expands and contracts in accordance with the temperature of the boiler water in a well known manner and operates to move a lever arm 65 about a fixed pivot 64 as shown. The lever arm 65 has an integral arm 63 extending substantially at right angles which forms a slider for another slide-wire potentiometer formed by resistance element 60. The arm 65 of the boiler thermostatic device is biased by a spring 71 in the direction of the mounting base of the bellows 68. One end of the resistance 60 is connected by a wire 54 to the thermostatic element 49 and the other end of the resistance 60 is connected by a wire 61 with the wire 53 previously described. The arm 63 is connected by a wire 66 with the proportioning motor 36 so that a series connection is formed from the thermostatic element 49 through the wire 54, arm 63 and wire 66 to the proportioning motor. Connected between the wires 54 and 52 is a resistance 59 which is similar to the resistance 60 which as above described is connected between wire 54 and wire 53 by connecting wire 61. At temperatures ordinarily maintained in the boiler, the bellows 68 is expanded to such an extent that the arm 63 remains at the right end of the resistance 60 and is prevented from further movement in that direction by a suitable stop means. It is only when the boiler water temperature falls below a predetermined minimum value that the arm 63 begins to slide to the left along the slide wire resistance 60. As indicated on the drawing the slider 50 of the thermostatic device 48 moves to the left upon a fall in temperature and in the opposite direction upon a rise in temperature. The thermostatic device 48 ordinarily operates in the same manner as the thermostatic device of the Taylor patent, previously referred to, to position the valve member 33 so as to maintain a predetermined desired temperature in the room being heated. It will readily be seen that when the arm 63 is at the right end of resistance 60, the resistances 59 and 60 have no effect upon the control of the proportioning motor 56 inasmuch as they are similar and balance each other. However, whenever the arm 63 moves to the left along the slide-wire resistance 60, it has the same effect on the control circuit as movement of the slider 50 to the right along the slide-wire resistance 51, that is, the effect of this movement is to reduce the resistance in parallel with the right-hand side of the proportioning circuit, that is, the side formed by the wire 53. Movement of arm 63 to the left will therefore tend to cause valve member 33 to move downwardly reducing the flow of water through the boiler and operating to prevent the boiler water temperature from falling below a predetermined minimum value.

The water circulating pump 24 is driven by an electrical motor which receives its energy through conductors 75 and 76. The conductor 75 is directly connected to the conductor 46 leading to an external source of power and the conductor 76 is connected to one electrode of the mercury switch generally indicated at 77. The other electrode of the mercury switch 77 is connected by a conductor 78 to a conductor 73 also leading to the external source of power. The mercury switch 77 includes an operating arm or lever 79 which is pivoted at 80 and which is arranged to be moved by a cam indicated at 81. The cam 81 is driven by the proportioning motor 36 through a shaft 82 and its contour is so arranged that it operates to move the lever arm 79 so as to close the mercury switch 77 thereby completing the electrical circuit to the motor or the circulating pump whenever the valve member 33 is in position to permit water to be circulated through the boiler. In other words, the contour of cam 81 is so arranged and its driving shaft 82 is so related to proportion motor 36 that the circulating pump will not be operated when valve member 33 is in position to by-pass all return water from header 23 and that the circulating pump will be operated whenever the valve is in position so that any part of the return water is not by-passed.

Assuming the parts are in the positions shown in the drawing, slider 50 of thermostatic device 48 will be in mid position on slide-wire resistance 51 and the room temperature will be at the desired predetermined value. At this time the boiler water temperature will be at a value above its minimum and the arm 63 will be at the right end of slide-wire resistance 60. Should the room temperature now fall slider 50 will move to the left along slide-wire resistance 51 tending to cut out resistance from the circuit including the wire 52, thermostatic element 49, wire 54, arm 63, and wire 66 to the proportioning motor. Reduction of the amount of resistance in this circuit will operate in the same manner as described in the Taylor patent to cause the proportioning motor 36 to rotate in one direction. The arrangement is such that the proportioning motor 36 will now operate to move the valve member 33 of the proportioning valve upwardly thereby increasing the proportion of the water circulated through the boiler and decreasing the proportion of water by-passed past the boiler. Thus the temperature of the water being supplied to the radiation spaces will be increased and the space or room temperature will tend to rise back to its predetermined value and the system will again assume a state of equilibrium. Upon a fall in space temperature the slider 50 will move to the right on slide-wire resistance 51 producing opposite effects to those described. In the event of a heavy heating load upon the system, for instance, during the morning pick-up period, when the room temperatures are being brought up from a relatively low temperature which has prevailed during a night shut-down period, a very large proportion of water will be circulated through the boiler and only a small proportion will be by-passed through connection 28. This will result in the boiler water temperature falling appreciably below the predetermined temperature value for which the thermostatic device 15 controlling the burner 11 is set. When the boiler water temperature falls to a certain predetermined minimum value, the bellows 68 will have contracted sufficiently so as to cause arm 63 to move to the left along slide-wire resistance 60. The effect of this movement of arm 63 will be to reduce the resistance in the parallel circuit connections between the wires 53 and 54. As above described, this will have the same effect as the movement of the slider 50 to the right on slide-wire resistance 51 and will operate to cause the proportioning motor 36 to move the valve member 33 downwardly thus reducing the volume of water circulated through the boiler and preventing the boiler water temperature from falling below a predetermined minimum value. When the arm 63 moves to the left along slide-wire resistance 60, it will be seen that this movement increases the resistance in the series connection between slider 50, wire 54, and wire 66 to the proportioning motor. The effect of this increase in resistance in the connection between wire 54 and proportioning motor is to desensitize the control of the potentiometer formed by slider 50 and slide-wire resistance 51. Thus the room temperature responsive device relinquishes control of the heating system to the boiler thermostat which assumes substantially full control and operates as above described to prevent the boiler water temperature from falling below a predetermined minimum value. Whenever the boiler water temperature again rises to a value sufficient to cause arm 63 to again move to the right end of resistance arm 60, the room temperature thermostatic device 48 again assumes full control of the system operating to maintain the room or space temperature at the proper value.

From the foregoing, it should be apparent to those skilled in the art that the present invention provides a heating system having certain novel features and a relationship of the elements thereof which overcome defects known to be present in preexisting heating systems and which brings about many advantageous results. The practice of alternately turning on and off the supply of heating medium to the radiation spaces as done in the past is eliminated by providing a motorized apparatus for positioning the by-pass valve. The employment of the boiler responsive thermostatic device in conjunction with a tankless type of hot water heater provides for a continuous supply of hot water at all times and eliminates the possibility of failure of the supply as often experienced in the past with heretofore known heating systems.

There are many variations, modifications and forms which the present invention may take and it is to be understood that the disclosed embodiment is to be interpreted only as illustrative and that the invention is to be limited only as determined by the appended claims.

I claim as my invention:

1. In a heating system having a boiler, in combination, a domestic hot water heater associated with said boiler, means for circulating water through said heating system, means for by-passing some of the return water past the boiler to the supply side of said system, and space temperature responsive means for regulating the proportions of water by-passed and circulated through the boiler whereby a predetermined temperature is maintained in said space, and means operable to regulate said by-pass means for preventing the boiler water from falling below a predetermined minimum temperature whereby hot water from said domestic heater is always available at temperatures above said minimum.

2. In a heating system having a boiler, in combination, means for circulating water through said system and means for causing a portion of it to by-pass said boiler, control means for regulating said by-pass operable to proportion the amounts of water by-passed and circulated through the boiler for maintaining a predetermined temperature in the space to be heated, means responsive to boiler water temperature for assuming control of said control means at a predetermined minimum boiler water temperature for preventing the water from going below said temperature whereby water is always available at temperatures above said minimum.

3. In a heating system having a boiler, in combination, means for circulating water through said system, means for causing a portion of it to by-pass said boiler, space temperature responsive means for regulating said by-pass means to proportion the amounts of water by-passed and circulated through the boiler for maintaining a predetermined temperature in said space, means responsive to boiler water temperatures for adjusting said by-pass means to prevent the boiler water temperature from falling below a predetermined minimum and means for energizing said circulating means whenever said by-pass means is in position for circulating water through the boiler.

4. In a heating system having a boiler, in combination, a heat exchanger for heating water for domestic use associated with said boiler, means for circulating water through said system, means for causing a portion of it to by-pass said boiler, space temperature responsive means for regulating said by-pass means to proportion the amounts of water by-passed and circulated through the boiler for maintaining a predetermined temperature in said space, means responsive to boiler water temperatures for adjusting said by-pass means to prevent the boiler water temperature from falling below a predetermined minimum value and means for energizing said circulating means whenever said by-pass means is in position for circulating water through the boiler.

5. In a heating system having a boiler, in combination, a heat exchanger for heating domestic hot water associated with said boiler, means for circulating water through said system, means for by-passing some of said water past said boiler and for proportioning the amounts of water by-passed and circulated through said boiler in response to the demand for heat for maintaining a constant temperature in the space being heated, means for preventing the temperature of the water in said boiler from falling below a predetermined minimum value for maintaining said domestic water at a suitably high temperature and means for energizing said circulating means whenever said by-pass means is in position to permit water to be circulated through the boiler.

6. A method of temperature control comprising circulating a heat transporting medium between a temperature changing means and a region the temperature of which is to be controlled, bypassing a portion of the medium past said temperature changing means, controlling the amount by-passed in response to the demand for heat, and further controlling the amount by-passed in response to the temperature in the temperature changing means to limit the variation in temperature of the medium therein.

7. In a temperature control system, in combination, temperature changing means, means for circulating a heat transporting medium between said first means and a region wherein the temperature is to be controlled, means for by-passing part of said medium past said temperature changing means, temperature responsive means for controlling said by-pass means in accordance with the demand for heat, and means responsive to the temperature of the medium in said first means for controlling said by-pass means.

8. In a heating system having a boiler, in combination, means for circulating water from said boiler to a space to be heated, a by-pass around said boiler, a space thermostat, means controlled by said space thermostat for increasing the amount of water flowing through said by-pass proportionately as said space temperature increases and decreasing the amount of water flowing through said by-pass proportionately as said space temperature decreases, and means for energizing said circulating means whenever any water is permitted to circulate through said boiler by said space temperature controlled means.

9. A heating system comprising in combination, a boiler, means for circulating water from said boiler to spaces whose temperature is to be controlled, a by-pass around said boiler, control means for increasing the proportion of water flowing through the by-pass as the load on the heating system decreases and decreasing the proportion of water flowing through the by-pass as the load on the heating system increases, and means for deenergizing said circulating means when said control means causes substantially all of the water to flow through the by-pass.

10. A heating system comprising in combination, a boiler, means for circulating water from said boiler to spaces whose temperature is to be controlled, a by-pass around said boiler, valve means for controlling the relative amounts of water circulating through said by-pass and through said boiler, means in control of said valve means for increasing the proportion of water flowing through said by-pass and decreasing the flow through said boiler as the load on said heating system decreases and decreasing the proportion of water flowing through said by-pass and increasing the flow through said boiler as the load on said heating system increases, a heater in heat exchange relation with said boiler for heating water for domestic use, and means responsive to boiler temperature for taking over the control of said valve means to substantially prevent the flow of water through said boiler when the temperature in the boiler is below the value necessary to properly heat the domestic hot water.

WILLIAM L. McGRATH.